United States Patent
Dolinsky et al.

(10) Patent No.: US 9,065,746 B2
(45) Date of Patent: Jun. 23, 2015

(54) COMPLIANCE TESTING ENGINE FOR INTEGRATED COMPUTING SYSTEM

(71) Applicant: VCE Company, LLC, Marlborough, MA (US)

(72) Inventors: Todd Dolinsky, Chapel Hill, NC (US); Jonathan P. Streete, San Jose, CA (US); Nicholas Hansen, Willow Spring, NC (US); Xuning Vincent Shan, Palo Alto, CA (US)

(73) Assignee: VCE Company, LLC, Richardson, TX (US)

( * ) Notice: Subject to any disclaimer, the term of this patent is extended or adjusted under 35 U.S.C. 154(b) by 173 days.

(21) Appl. No.: 13/729,488

(22) Filed: Dec. 28, 2012

(65) Prior Publication Data

US 2014/0059385 A1 Feb. 27, 2014

Related U.S. Application Data

(60) Provisional application No. 61/693,221, filed on Aug. 24, 2012.

(51) Int. Cl.
*G06F 11/00* (2006.01)
*H04L 12/24* (2006.01)
(Continued)

(52) U.S. Cl.
CPC ............ *H04L 41/12* (2013.01); *G06F 11/3086* (2013.01); *G06F 11/008* (2013.01);
(Continued)

(58) Field of Classification Search
CPC ............. G06F 11/008; G06F 11/3051; G06F 11/3086; G06F 9/4411; H04L 41/022; H04L 41/0233; H04L 41/0856; H04L 41/12; H04L 43/0817; Y04S 40/162; Y04S 40/168

USPC .................... 714/33, 37, 40; 702/186; 726/25
See application file for complete search history.

(56) References Cited

U.S. PATENT DOCUMENTS

| | | | |
|---|---|---|---|
| 6,549,943 | B1 | 4/2003 | Spring |
| 6,901,346 | B2 | 5/2005 | Tracy et al. |

(Continued)

FOREIGN PATENT DOCUMENTS

WO WO 2011128596 10/2011

OTHER PUBLICATIONS

International Search Report, PCT/Us2013/056443, mailed Mar. 12, 2013.

(Continued)

*Primary Examiner* — Marc Duncan
(74) *Attorney, Agent, or Firm* — Womble Carlyle Sandridge & Rice, LLP

(57) ABSTRACT

A technique tests whether an integrated computing system having server, network and storage components complies with a configuration benchmark expressed as rules in first markup-language statements such as XML. The rules are parsed to obtain test definition identifiers identifying test definitions in a second set of markup-language statements, each test definition including a test value and an attribute identifier of system component attribute. A management database is organized as an integrated object model of all system components. An interpreter invoked with the test definition identifier from each rule process each test definition to (a) access the management database using the attribute identifier obtain the actual value for the corresponding attribute, and (b) compare the actual value to the test value of the test definition to generate a comparison result value that can be stored or communicated as a compliance indicator to a human or machine user.

28 Claims, 7 Drawing Sheets

(51) Int. Cl.
*G06F 9/44* (2006.01)
*G06F 11/30* (2006.01)
*H04L 12/26* (2006.01)

(52) U.S. Cl.
CPC ............ *G06F9/4411* (2013.01); *H04L 41/022* (2013.01); *H04L 41/0233* (2013.01); *H04L 41/0856* (2013.01); *H04L 43/0817* (2013.01); *G06F 11/3051* (2013.01); *Y04S 40/162* (2013.01); *Y04S 40/168* (2013.01)

(56) References Cited

U.S. PATENT DOCUMENTS

| | | | |
|---|---|---|---|
| 6,996,517 B1* | 2/2006 | Papaefstathiou | 703/22 |
| 7,096,502 B1* | 8/2006 | Fox et al. | 726/25 |
| 7,197,489 B1 | 3/2007 | Gauvin et al. | |
| 7,234,093 B2 | 6/2007 | Kadkade | |
| 7,454,487 B1 | 11/2008 | Becher et al. | |
| 7,536,599 B2 | 5/2009 | Paliwal et al. | |
| 7,627,891 B2 | 12/2009 | Williams et al. | |
| 7,757,121 B1* | 7/2010 | Perron et al. | 714/26 |
| 8,065,660 B1 | 11/2011 | Tanner et al. | |
| 8,122,261 B2 | 2/2012 | Sakamura et al. | |
| 8,140,899 B2 | 3/2012 | Ren et al. | |
| 8,161,559 B2 | 4/2012 | Bowden et al. | |
| 8,224,775 B2 | 7/2012 | Schwartz et al. | |
| 8,539,589 B2 | 9/2013 | Prafullchandra et al. | |
| 8,627,275 B1 | 1/2014 | Belov et al. | |
| 8,707,385 B2* | 4/2014 | Jain et al. | 726/1 |
| 8,800,047 B2 | 8/2014 | Kline et al. | |
| 2002/0069035 A1* | 6/2002 | Tracy et al. | 702/181 |
| 2005/0081103 A1* | 4/2005 | Kadkade | 714/37 |
| 2005/0257267 A1* | 11/2005 | Williams et al. | 726/25 |
| 2006/0026463 A1* | 2/2006 | Paliwal et al. | 714/37 |
| 2009/0100178 A1 | 4/2009 | Gonzales et al. | |
| 2010/0333205 A1* | 12/2010 | Bowden et al. | 726/25 |
| 2011/0289355 A1* | 11/2011 | Ren et al. | 714/37 |
| 2012/0204267 A1* | 8/2012 | Prafullchandra et al. | 726/25 |
| 2012/0291132 A1* | 11/2012 | Kline et al. | 726/25 |
| 2013/0009118 A1 | 1/2013 | Stroessel et al. | |
| 2013/0110799 A1 | 5/2013 | Hoppe et al. | |
| 2013/0339498 A1* | 12/2013 | Johnson | 709/221 |

OTHER PUBLICATIONS

Mohammed Noraden Alsaleh et al: "SCAP based configuration analytics for comprehensive compliance checking", Configuration Analytics and Automation (SAFECONFIG), 2011 4th Symposium on, IEEE, Oct. 31, 2011, pp. 1-8, XP032079153, DOI: 10.1109/SAFECONFIG.2011.6111674 ISBN: 978-1-4673-0401-6.
Robert A Martin Editor: "Draft Recommendation ITU-T X.xccdf, Extensible Configuration checklist description format;TD 1995r1", ITU-T Draft ; Study Period 2009-2012, International Telecommunication Union, Geneva ; CH, vol. 4/17, Dec. 1, 2011, pp. 1-93, XP017571649, [retrieved on Dec. 1, 2011].
An Introduction to the OVAL (trademarked) Language, Version 5.0, (c)2006 The MITRE Corporation, pp. 1-14.
Positive Research Center, Introduction to XCCDF, security benchmark automation, Apr. 11, 2012, pp. 1-5.
Worrell, Bryan, An Introduction to XCCDF, security benchmark automation, (c)2010 The MITRE Corporation, pp. 1-30.
Buttner, Andrew, Security Content Automation Protocol (SCAP) Introduction, Oct. 26, 2009, pp. 1-102.
Schmidt, Charles, Technical Introduction to SCAP, (c)2010 The MITRE Corporation, pp. 1-29.
The Security Content Automation Protocol (SCAP), Jul. 21, 2010, obtained at http://scap.nist.gov/events/2010/cyberscope/SCAP%20Overview.pdf on Apr. 25, 2013.
Specification for the Extensible Configuration Checklist Description Format (XCCDF) Version 1.2, Mar. 2012, obtained at http://csrc.nist.gov/publications/nistir/ir7275-rev4/nistir-7275r4_updated-march-2012_clean.pdf on Apr. 25, 2013.
Introduction to OVAL—Open Vulnerability and Assessment Language, 2007, obtained at http://nvd.nist.gov/scap/docs/conference%20presentations/workshops/OVAL%20Tutorial%201%20-%20Overview.pdf on Apr. 25, 2013.
Case, Fedor, Schoffstall, Davin, "A Simple Network Management Protocol (SNMO)" May 1990.
Distributed Management Task Force, Inc. and WBEM Solutions, Inc., "CIM Tutorial" 2013.
Cisco Systems, Inc. "CISCO USC Manager XML API Programmers Guide", Apr. 21, 2011.
English language translation of WO 2011128596, Vicat-Blanc-Primet et al. Oct. 20, 2011.
International Search Report, PCT/US2013/056446, mailed Nov. 21, 2013.

* cited by examiner

```xml
<Benchmark ...>
...
<Group id="xccdf_com.vce_group_base_mgmt" weight="1.0">
    <title>Management</title>
    <Value id="xccdf_com.vce_value_pwrpath_version" operator="equals">
        <title>EMC PowerPath/VE Version</title>
        <description>The current running firmware version of the EMC PowerPath/VE</description>
        <value selector="5.7 P02">5.7 SP 0 \(build 3\)</value>
        <value selector="5.7 P01">5.7 SP 0 \(build 2\)</value>
    </Value>
    ...
    <Rule role="full" id="xccdf_com.vce_rule_pwrpath_version" selected="false" weight="1.0" severity="high">
        <title>EMC PowerPath/VE for VMware Version</title>
        <description>PowerPath version should match expected for compliance.</description>
        <check system="http://oval.mitre.org/XMLSchema/oval-definitions-5">
            <check-export export-name="oval:com.vce.oval:var:100" value-id="xccdf_com.vce_value_pwrpath_version"/>
            <check-content-ref name="oval:com.vce.oval:def:100" href="vce-rcm-oval.xml"/>
        </check>
    </Rule>
    ...
</Group>
...
</Benchmark>
```

Fig. 6

```xml
<oval_definitions...>
  ...
  <definitions>
    <definition class="compliance" version="1" id="oval:com.vce.oval:def:100">
      ...
      <criteria operator="AND">
        <criterion test_ref="oval:com.vce.oval:tst:100" negate="false" comment="sample"/>
      </criteria>
    </definition>
    ...
  </definitions>
  <tests>
    <esx_test xmlns="http://oval.mitre.org/XMLSchema/oval-definitions-5#vblock" version="1" id="oval:com.vce.oval:tst:100" comment="EMC PowerPath Driver Test" check="all">
      <object object_ref="oval:com.vce.oval:obj:401"/>
      <state state_ref="oval:com.vce.oval:ste:100"/>
    </esx_test>
    ...
  </tests>
  <objects>
    <esx_object xmlns="http://oval.mitre.org/XMLSchema/oval-definitions-5#vblock" version="1" id="oval:com.vce.oval:obj:401"/>
    ...
  </objects>
  <states>
    <esx_state xmlns="http://oval.mitre.org/XMLSchema/oval-definitions-5#vblock" version="1" id="oval:com.vce.oval:ste:100">
      <emcpVersion var_ref="oval:com.vce.oval:var:100" operation="pattern match"/>
    </esx_state>
    ...
  </states>
  <variables>
    <external_variable version="1" id="oval:com.vce.oval:var:100" comment="EMC Powerpath Expected Version" datatype="string"/>
    ...
  </variables>
</oval_definitions>
```

Fig. 7

```
<Benchmark ...>
...
<Group id="xccdf_com.vce_group_sample_slib_2" weight="1.0">
    <title>Sample Group 2</title>
    <Value id="xccdf_com.vce_value_slib2" operator="equals">
        <title>Sample Value: Switch Status</title>
        <description>Determine switch state</description>
        <value selector="operable">operable</value>
    </Value>
    <Rule role="full" id="xccdf_com.vce_rule_slib2" selected="false" weight="1.0" severity="high">
        <title>Sample Rule: Switch Status</title>
        <description>Determine whether all switches have the specified state.</description>
        <check system="http://oval.mitre.org/XMLSchema/oval-definitions-5">
            <check-export export-name="oval:com.vce.oval.sample:var:200" value-id="xccdf_com.vce_value_slib2"/>
            <check-content-ref name="oval:com.vce.oval.sample:def:200" href="sample-oval.xml"/>
        </check>
    </Rule>
</Group>
...
</Benchmark>
```

Fig. 8

```
<oval_definitions...>
...
<definitions>
<definition class="compliance" version="1" id="oval:com.vce.oval.sample:def:200">
<criteria operator="AND">
<criterion test_ref="oval:com.vce.oval.sample:tst:200" negate="false" comment="sample"/>
</criteria>
</definition>
</definitions>
<tests>
<switch_test xmlns="http://oval.mitre.org/XMLSchema/oval-definitions-5#vblock" version="1" id="oval:com.vce.oval.sample:tst:200" comment="Cisco Switch Test" check="all">
<object object_ref="oval:com.vce.oval.sample:obj:200"/>
<state state_ref="oval:com.vce.oval.sample:ste:200"/>
</switch_test>
...
</tests>
<objects>
<switch_object xmlns="http://oval.mitre.org/XMLSchema/oval-definitions-5#vblock" version="1" id="oval:com.vce.oval.sample:obj:200"/>
...
</objects>
<states>
<switch_state xmlns="http://oval.mitre.org/XMLSchema/oval-definitions-5#vblock" version="1" id="oval:com.vce.oval.sample:ste:200">
<calculatedStatus var_ref="oval:com.vce.oval.sample:var:200" operation="equals"/>
</switch_state>
...
</states>
<variables>
<external_variable version="1" id="oval:com.vce.oval.sample:var:200" comment="Sample Switch Status" datatype="string"/>
...
</variables>
</oval_definitions>
```

Fig. 9

COMPLIANCE TESTING ENGINE FOR INTEGRATED COMPUTING SYSTEM

BACKGROUND

The invention is in the field of data processing (computing) systems, and more particularly in the field of testing computing systems for compliance with configuration requirements.

Compliance testing is used to compare the actual configuration of a computer to a specified or "benchmark" configuration. In some cases, for example, an organization such as the government or a corporation may require that a computer have a particular configuration to satisfy security or interoperability needs. The benchmark configuration may identify various hardware and software elements required for compliance, as well as required values of attributes of the elements. For example, a benchmark may identify an operating system (element) as well as a revision level (attribute) of the operating system that is known to provide certain security-related functionality.

The US government sponsors a suite of security-related specifications and other resources under an umbrella known as Security Content Automation Protocol or SCAP. Included in this suite are XML-based languages for expressing configuration benchmarks and compliance testing. SCAP techniques have been used for compliance testing computers such as government-issued portable computers, as well as for other components of data processing systems such as network switches.

SUMMARY

Data processing systems may be relatively complex collections of various different types of components, including for example computers, storage devices or subsystems, and network components such as switches. There is a need for compliance testing of such complex data processing systems in an efficient manner.

While existing compliance testing techniques can be used with respect to individual components of a system, such as for a network switch for example, there are shortcomings to such techniques as their limitation to use with individual components makes them ill-suited for testing a system having a complex collection of distinct components. For example, such existing techniques cannot effectively capture dependencies among the different components in an automated way. One test may be used to identify presence of a certain network switch as well as its configuration, for example, and another to identify a configuration of a compute server. However, there may be required relationships between those two configurations, such as required revisions of respective software or firmware components for proper interoperability or security. It may be necessary to rely on an administrative, human-implemented procedure to express and test for satisfaction of such relationships.

The above difficulties may be more pronounced when data processing systems are deployed using complex but well-defined building blocks. As computer technology has progressed with ever greater levels of integration, it is possible to create an entire integrated computing system having compute, storage and network elements as such a discrete building block, usable to provide well-defined and scalable computing platforms for a variety of applications. Efficient automated testing of such complex integrated computing systems is desirable.

Methods and apparatus are disclosed for testing whether an integrated computing system complies with a predetermined configuration benchmark, which is expressed as a collection of rules in a first set of markup-language statements such as XML. The integrated computing system includes interconnected components of different types, which may be selected from a server type, a network switch type, and a storage subsystem type for example.

A disclosed method includes parsing the rules to obtain test definition identifiers identifying test definitions in a second set of markup-language statements. Each test definition includes a test value and an attribute identifier of an attribute of a component of the system, where the attribute has an actual value to be tested against the test value. The attribute identifier identifies an object in an integrated object model for system management information for the components of the system. The integrated object model expresses physical and functional relationships among all the components of the integrated computing system. Thus the object model reflects the system as a whole, enabling uniform access to management information about all the components so as to enable automated testing for relationships among them.

The method includes invoking an interpreter for the second set of markup-language statements. The interpreter is invoked with the test definition identifiers from the rules to process the corresponding test definitions to (a) access the management database using the attribute identifiers of the test definitions to obtain the actual values for the corresponding attributes, and (b) compare the obtained actual values to the test values of the test definitions to generate comparison result values indicating whether the attribute is in compliance with the rule containing the test definition identifier. This comparison result values can be stored or communicated as compliance indicators to a human or machine user.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 6-9 are listings of markup-language statements expressing test benchmarks and test methods.

DETAILED DESCRIPTION

The following US patent application is incorporated by reference herein:

Controlling Converged IT Infrastructure, U.S. Application No. 61/693,221 filed Aug. 24, 2012.

Figure 1:
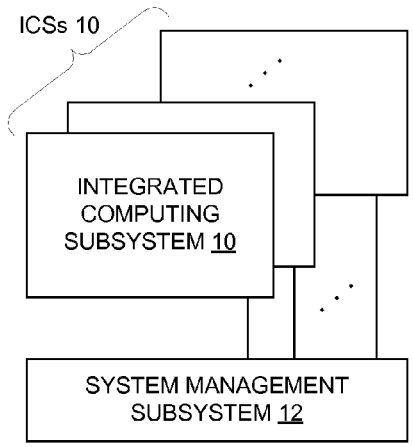
FIG. 1 is a block diagram of a data processing system.

FIG. 1 shows an example data processing system including one or more integrated computing subsystems (ICSs) 10 each being communicatively coupled to a system management subsystem 12. As described more below, each ICS 10 includes hardware computing components from the different domains of computing components, network components and storage components, as well as system software components such as operating systems and virtualizing software such as hypervisors. A given system may utilize as many ICSs 10 as necessary to support a given workload, and ICSs 10 can be added incrementally over time to support increasing workloads. The term "integrated" refers to both logical/functional and physical packaging that provides a unitary aspect to the collection of computing components in each ICS 10. For example, an ICS 10 may be designed to be deployed using a set of one or more equipment racks with predefined positions and interconnection options for the components. Further, an ICS 10 is tested, configured and managed as a unit, and may be subject to an explicit qualification standard as a unit, so that those designing large systems can use ICSs 10 as standardized building blocks with confidence in their expected performance. In one embodiment, an ICS 10 may be realized as a VBlock™ system sold by VCE Company.

The system management subsystem 12 is used for system management tasks vis-à-vis the ICSs 10 such as configuration, monitoring, testing, etc. Such tasks may also be referred to as "maintenance and operating" or M & O activities. As described more below, one significant feature of the system management subsystem 12 is its use of an integrated representation of all managed components in the ICSs 10, including both hardware and software resources and across different domains of hardware resources in particular. Additionally, the system management subsystem 12 includes structures and functions that can be used for compliance testing of each ICS 10, such as whether the actual configuration of a given ICS 10 complies with a specified benchmark configuration. Compliance testing makes use of the integrated representation for flexible, efficient and powerful specification of compliance rules and tests.

Figure 2:
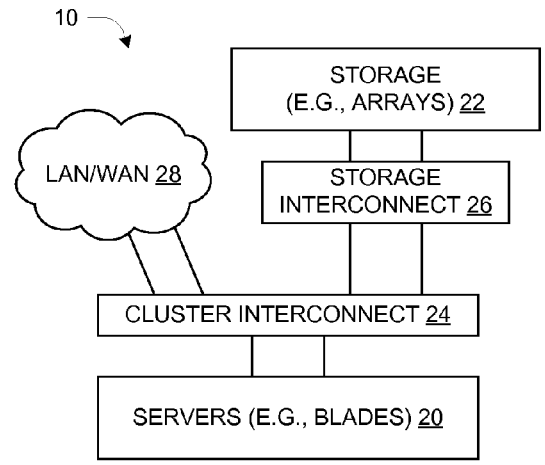
FIG. 2 is a block diagram of an integrated computing subsystem.

FIG. 2 shows an example structure of an ICS 10. It includes a set of servers 20, which may be so-called "blade" servers having a compact, modular form for ready inclusion into a standard equipment rack. Also included is a storage subsystem 22 which includes one or more sets or "arrays" of storage devices (e.g., disk drives) and associated storage controllers. The ICS 10 further includes network or interconnection circuitry shown as cluster interconnect 24 and storage interconnect 26. The cluster interconnect 24 provides high-capacity data interconnections between the servers 10 and other parts of the system, including local-area and/or wide-area networks (LAN/WAN) 28 and the storage subsystem 22 via the storage interconnect 26. The storage interconnect 26 provides storage-oriented (e.g., block-oriented) high-capacity data interconnections between the storage subsystem 22 and the servers 20 via the cluster interconnect 24. An ICS may be structured differently in some embodiments, including those employing network-attached storage which may not utilize the specialized storage interconnect 26.

Although not depicted in FIG. 2, the various components of an ICS generally each include some type of management interface enabling an external management application or device to both provide and obtain component-specific management information. For example, network switches utilized to realize the interconnects 24, 26 may provide a so-called Simple Network Management Protocol (SNMP) interface enabling a separate SNMP management application to interrogate a switch for operational information (e.g., hardware status indicators, network traffic counters, event information, etc.) and to provide input to tailor operation (e.g., configuration information, parameter values). Some management protocols provide for reporting asynchronous events that may require specific prompt attention. SNMP, for example, includes "trap" messages/transactions usable for such event reporting. The system management subsystem 12 is functionally coupled to each of these component-specific management interfaces. In some cases, the coupling may be direct, i.e., via a specific component-specific connection, while in other cases there may be an intermediate component manager potentially providing a somewhat more abstracted view of its underlying component(s).

Figure 3:
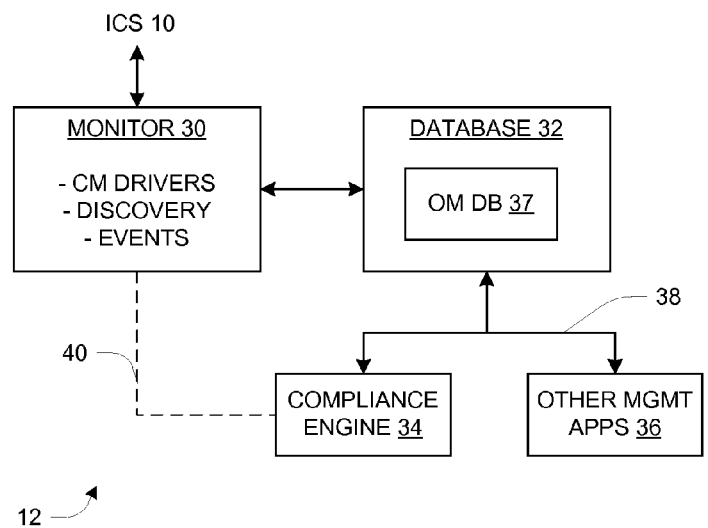
FIG. 3 is a block diagram of a system management subsystem.

FIG. 3 shows an example structure of the system management subsystem 12. It includes a monitor subsystem 30, database subsystem 32, and system management engines/applications including a compliance engine 34 and potentially other management applications 36. As indicated, the monitor subsystem 30 has functional components including component management (CM) drivers, discovery coordinator, and an event subsystem. The CM drivers are for the component- or protocol-specific management interfaces to the components of the ICS 10, identified as "ICS COMPs". The discovery coordinator has responsibility in a discovery process by which the structure and status of the ICSs 10 becomes known and corresponding system information becomes stored in the database 32. The event subsystem provides for detection and reporting of events (e.g., SNMP traps) as well as for event signaling within the management subsystem 12 itself. Examples are described below.

As also indicated in FIG. 3, the database subsystem 32 includes an integrated object model (OM) management database 37 for the system and exports an OM application programming interface (API) 38 via which the management applications 34, 36 obtain management information stored in the OM database 37. In one embodiment, the OM API 38 may utilize a protocol for distributed access known as Representational State Transfer (REST). A REST API employs uniform resource locators (URLs) and/or uniform resource identifiers (URIs) to specify resources or objects that are the subject of REST commands and responses, as generally known in the art. Certain details of the OM database and OM API 38 are provided below.

The compliance engine 34 is a specialized management application for assessing whether the system, and specifically each ICS 10, complies with certain well-defined specifications for configuration or other aspects of design and/or deployment. It does this based on management information it obtains from the database 37 using the OM API 38. More detail about the compliance engine 34 and its operation are given below. As shown, it may also have one or more additional interfaces 40 to the monitor 30, or in some cases even directly to component managers for the components of the ICSs 10, to obtain management information that for some reason is not obtainable via the database 37 and OM API 38.

As mentioned, in one embodiment the OM database 37 is structured as a set of objects or "resources" and the OM API 38 employs URLs to identify resources that are the subject of requests and responses. More particularly, the OM API 38 may employ a so-called Representational State Transfer (REST) Web Services interface for the OM database 37 having a complete set of URLs to obtain data on the entire physical model discovered on an ICS 10. The set of REST resources may be organized according to an XML-style schema. While the remaining description makes specific references to a REST type of implementation, in alternative embodiments other types of interfaces may be used including those following the Simple Object Access Protocol (SOAP).

The following is an example of a URL identifying a resource in the OM database 37, in this case a listing of "fabric interconnects", which are components within the cluster interconnect 24 of FIG. 1. This URL is included in a REST request sent from the compliance engine 34 to the OM database 37, after being obtained from an OVAL test definition for some test directed to a fabric interconnect:

http://localhost:port/om/computesystem/{computesystem id}/fabricinterconnects

The following is an example portion of a corresponding REST response. The information for the fabric interconnects is provided as a set of tagged values. The REST response for the fabricinterconnects object includes tagged segments or groups of statement for each individual fabric interconnect device, which is a system component, as well as individual tagged values which are attributes of the fabric interconnect device (e.g., its last operational status as shown in the example below). Within the group of statements for a given object may be URLs for sub-components, usable in separate REST requests to obtain more specific information about them. For example, a fabric interconnect includes circuit modules called "fabric modules", so each fabricinterconnect group includes a corresponding tagged URL for this sub-object.

```
<fabricinterconnects>
    <fabricinterconnect>
        <dbId>897987</dbId>
        <calculatedStatus>unknown</calculatedStatus>
        <description>Mock Cisco UCS 61x0 Fabric Interconnect A</description>
        <lastOperStatus>unknown</lastOperStatus>
        ...
        <fabricmodules>
            http://localhost:8080/fm/fabricinterconnect/897987/fabricmodules
        </fabricmodules>
        ...
    </fabricinterconnect>
    ...
</fabricinterconnects>
```

Figure 4:
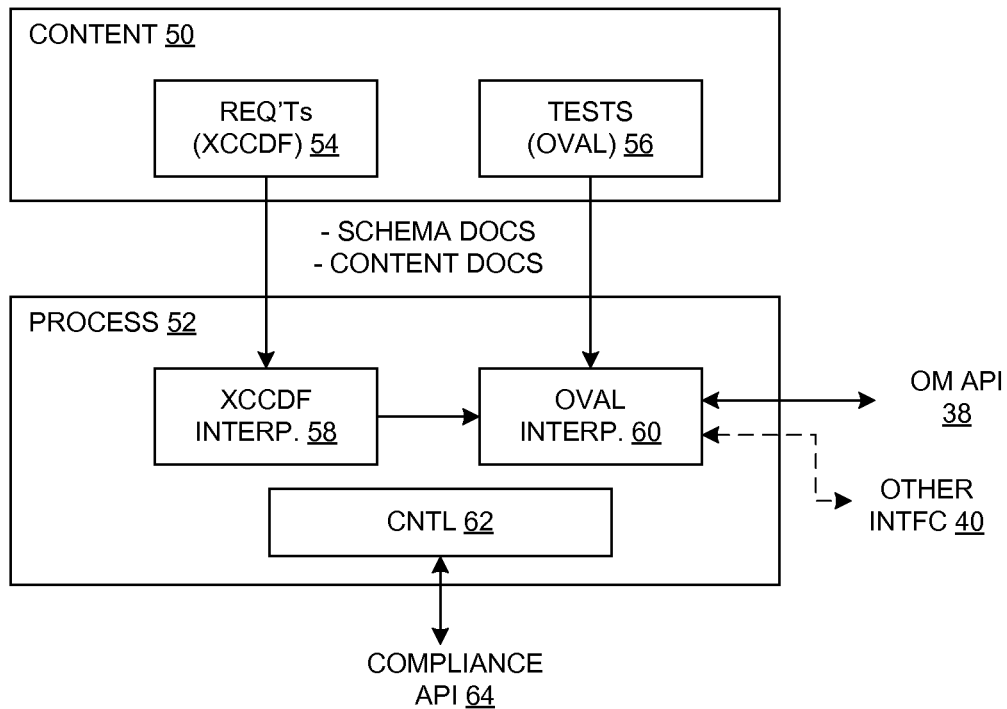
FIG. 4 is a block diagram of a compliance engine.

FIG. 4 shows an example structure of the compliance engine 34, which includes content elements 50 and process components 52. Content elements 50 include data files specifying requirements (REQ'Ts) 54 and those specifying tests 56. As shown, these may be organized according to certain standards used in compliance testing known as eXtensible Configuration Checklist Description Format (XCCDF) and Open Vulnerabilities Assessment Language (OVAL) respectively. Both XCCDF and OVAL employ eXtensible Markup Language (XML) according to corresponding XML schema. In one embodiment, an XCCDF-based requirements file 54 may use a standardized XCCDF schema for defining rules that collectively represent a configuration benchmark against which the system is to be tested for compliance. As described in more detail below, the OVAL-based tests file 56 may employ a more customized schema tailored for use with the integrated OM database 37 and API 38. As indicated, the information provided from the content elements 50 includes both schema documents (docs) and content documents, where the content documents provide the actual usable information according to schemas described in the schema documents.

In the description that follows, the specific case of using XCCDF and OVAL is assumed, and thus the elements 54 and 56 are referred to as the XCCDF files and OVAL files 56. This is merely for convenience and ease of understanding and is not to be interpreted as limiting.

The process components 52 include respective interpreters for the requirements (XCCDF) files 54 and tests (OVAL) files 56, shown as an XCCDF interpreter 58 and OVAL interpreter 60 respectively. They also include separate control components (CNTL) 62 that manage different aspects of the operations performed by the process components 52 as a unit. The control components 62 include a compliance API 64 via which a client application configures, executes, and obtains results from units of compliance testing operations referred to as "scans". The OVAL interpreter 60 includes a requestor-side implementation of the OM API 38, and may include other interfaces 40 as mentioned above. Techniques for parsing or interpreting XML are generally known in the art and may be utilized in realizing the interpreters 58, 60. In fact, in one embodiment an available open-source XCCDF interpreter may be used. However, the use of a custom OVAL schema means that the OVAL interpreter 60 will be correspondingly customized, so that an off-the-shelf or open-source implementation may not be suitable.

FIG. 4 includes an arrow from the XCCDF interpreter 58 to the OVAL interpreter 60. This represents a logical flow of information arising from the respective functions of the XCCDF content 54 and OVAL content 56. The XCCDF content 54 expresses configuration requirements in the form of rules, for example, but does not represent how to actually test a system for compliance with the rules. That part of compliance testing is provided by the OVAL content 56—it specifies particular tests to be performed, with references to system components and their attributes as represented in the OM DB 37, along with particular numerical and/or logical conditions to be satisfied. The rules in the XCCDF files 54 contain references to corresponding tests that are defined in the OVAL files 56 and implemented in the OVAL interpreter 60. Thus, part of operation is passing test references obtained from parsed XCCDF rules into the OVAL interpreter 60 where they are used to select specific OVAL tests and to provide comparison values used in the tests. Examples are given below.

Figure 5:
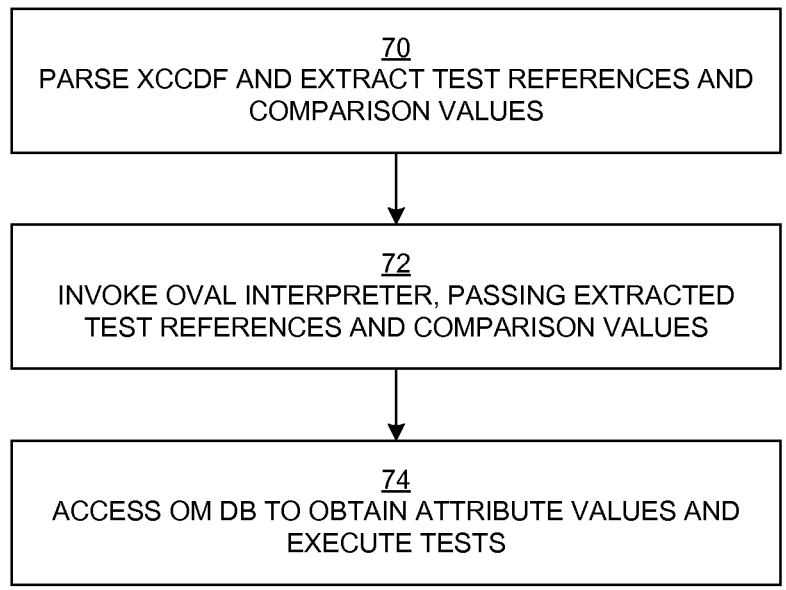
FIG. 5 is a high-level flow diagram of compliance testing.

FIG. 5 shows an example of functions performed in compliance testing at a high level. At 70, the XCCDF interpreter 58 parses the XCCDF file(s) 54 in order to obtain test references as well as comparison values, where the test references identify tests that are defined in the OVAL content 56. At 72, the OVAL interpreter 60 is invoked with the test references and comparison values extracted from the XCCDF files 54, and at 74 the OVAL interpreter 60 initiates accesses to the OM DB 37 to obtain actual attribute values and performs the specified tests using the results. The control component 62 provides what may be viewed as "glue" logic that connects the functions provided by the interpreters 58 and 60 so as to achieve this overall operation.

FIGS. 6-9 provide two examples of content 50. FIG. 6 is a snippet of a first XCCDF file 54, and FIG. 7 is a snippet of a corresponding OVAL file 56. In this example, the XCCDF file of FIG. 6 includes a rule expressing a required version for a driver called PowerPath/VE. This rule includes a <check> group referring to a variable identified as "100" and a definition identified as "100" in an identified OVAL file. FIG. 7 shows the content of the OVAL file with definition 100 (near top) as well as variable 100 (near bottom). The definition includes a <criteria> group describing an operator (logical AND) and identifying a test (test 100) which appears further on in the code as a group tagged <esx_test>. The test in turn references an "object" 400 and a "state" 100, which appear yet further down in the code. The <esx_object> group contains a locator value for an object in the OM database 37 containing information about a PowerPath/VE driver in the system (if any). The <esx_state> group contains a locator value for a "state" or attribute of that object, in this case state 100 which is the PowerPath version string. This group also specifies a variable (var. 100) to be used for testing, as well as the operation to be performed (pattern match). In operation, the OVAL interpreter 60 and control logic 62 use these values to query the OM database 37 via the OM API 38 and to perform the pattern-matching test against the result that is returned. The recording and other use of the result is not described herein. As known in the art, OVAL also supports results files whose contents can be separately processed as desired for presenting results to an application or system user.

FIGS. 8 and 9 present another example that is not described in detail. In this case the rule and testing are with respect to the operational status of a network switch, where the compliant result is a match with the string "operable". The XCCDF content (FIG. 8) identifies the requirement (status equals "operable") and the OVAL definition to be used (200), and the OVAL content (FIG. 9) identifies the object and state from the OM database 37 to be tested.

As mentioned above, one advantage of the presently disclosed technique is the ability to capture cross-domain dependencies in compliance testing, i.e., to specify and test for certain combinations of attribute values among all or any subset of compute resources, network resources and storage resources. In one example, not shown, there is a specification regarding a degree of network segmentation to limit scope of a compliance assessment. In such a case, OVAL criteria is used to examine the segmentation of the network (physical or virtual) in an ICS 10 to automatically determine the assets (components) that are in scope for the remainder of a scan (i.e. whether patches are up to date, etc.).

The following is an example illustrating such dependencies using OVAL coding. In this case, a test is satisfied if either of two conditions is true. The first condition is that network segment 1 is "in scope" for (i.e., to be included in) a scan and the patches are up to date on the servers attached to the network segment. The second condition is that network segment 1 is not in scope for the scan, i.e., is not to be tested as part of the scan. "In scope for scan" is an attribute of a network segment, while "patches up to date" is an attribute of a virtual server (computing software component) connected to the network segment.

```
Compliant if:
    <criteria operator="OR">
        <criteria operator="AND">
            <criterion "test whether network segment 1 is in scope for
            PCI Assessment">
            <criterion "test whether patches up to date on virtual servers
            in network 1">
        </criteria>
        <criterion "test whether network segment 1 is NOT in scope for
        PCI Assessment">
    </criteria>
```

Referring back to FIG. 4, the compliance API 64 may be used to control all aspects of the compliance scans that are executed by the compliance engine 34, including for example starting a scan on demand of a human or machine user. It may be desirable to automate certain aspects of this control however, and in particular to use "event-initiated" scans that are started in response to occurrence of one or more specified events in the system. Event-driven activity can make use of facilities provided by the above-mentioned event subsystem of the monitor 30, which can be implemented in the form of a Java message queue for example. One use of event-initiated scanning is as a response to changes in the system configuration as may be detected by the monitor 30, for example. In this case, the monitor 30 detects the change and creates a corresponding event. The compliance engine 34 is configured to listen for such an event, and upon detecting the event it initiates a compliance scan. In some cases this may be a full system compliance scan, while in others it may be a scan more focused and specific to the change that initiated it. An example of this kind of operation is the addition or removal of a hardware component such as a server 20.

Figure 10:
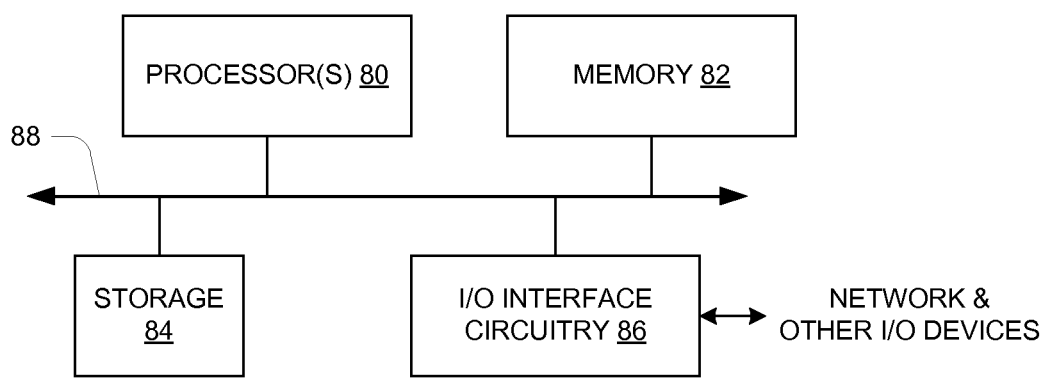
FIG. 10 is a block diagram of a computer hardware.

FIG. 10 shows an example configuration of a physical computer from a computer hardware perspective. In one embodiment, the system management subsystem 12 may be realized as a distinct physical computing platform having one or more physical computers. In other embodiments, the system management subsystem 12 may be realized using a virtual machine organization in which its components are deployed in one or more virtual machine execution environments of physical computers. In the latter case, the system management subsystem 12 may include computing hardware of an ICS 10 that it manages, i.e. servers 20.

Referring to FIG. 10, the physical computer hardware includes one or more processors 80, memory 82, and interface circuitry 84 interconnected by data interconnections 86 such as one or more high-speed data buses. The interface circuitry 84 provides a hardware connection to external interconnect and other external devices/connections (EXT DEVs). The processor(s) 80 with connected memory 82 may also be referred to as "processing circuitry" herein. In operation, the memory 82 stores data and instructions of system software (e.g., operating system) and one or more application programs which are executed by the processor(s) 80 to cause the hardware to function in a software-defined manner. Thus the computer hardware executing instructions of a management application, such as described herein, can be referred to as a management circuit or management component, and it will be understood that a collection of such circuits or components can all be realized and interact with each other as one or more sets of computer processing hardware executing different computer programs as generally known in the art.

While various embodiments of the invention have been particularly shown and described, it will be understood by those skilled in the art that various changes in form and details may be made therein without departing from the scope of the invention as defined by the appended claims.

While in the above description the various components are specifically included in respective ICSs 10, in alternative embodiments some components may be uncommitted to any particular ICS 10, and virtual machines are provisioned from the resources on the fly.

For example, the system management subsystem 12 may be implemented in different ways, specifically using alternatives or supplements for obtaining and/or storing the management information. Some or all management information may be maintained in an in-memory data structure rather than in a database of the type commonly residing on secondary storage. Additionally, as indicated the compliance engine 34 may utilize a separate interface apart from the OM API 38 to access management information.

One particular use scenario may be in a host-tenant environment in which different applications and/or virtual machines of a set of tenant organizations execute on host-provided hardware resources. In this kind of system, one or more tenants may be running their own compliance engine against components (software and/or hardware) that they are using, while the hosting organization also runs a compliance engine that not only checks "common" (not tenant-specific) components, but also interrogates a tenant's compliance engine for its compliance state. This interrogation may be over a specialized interface to which the compliance engine 34 connects to the other compliance engine.

In another scenario the compliance engine 34 may check whether data it requires is in the database (OM DB 37), and if not, uses some alternative means to fetch the data for an evaluation. For example, a system component may be unsupported in the database/object model, but it has attributes to be tested for compliance evaluation (e.g., logical configurations, or simply settings that have not yet been included in the object model).

In the above description examples are given using XML-based languages, but in other embodiments other types of markup language may be used.

Additionally, there are a wide variety of other types of system components, including software types, that fall within the scope of compliance testing as described herein. Specific examples of software types are a hypervisor and an operating system or application running either on a hypervisor or directly on server 20. There are common scenarios where context for such components is relevant for a compliance assessment. For example, it may be required that different workloads (applications) from different customers be executed on different physical servers 20, which can be seen as a required relationship between a hardware type of component and a software type of component. In an example of a required relationship between different software component types, certain types of applications may be required to run on hypervisors with specific configurations. Testing for compliance requires contextual information in addition to the kinds of hardware-focused information described above.

It is also noted that the content 50 may have either a relatively static or a more dynamic nature. In one case, reference configurations may be defined and be applicable across a large number of systems for long periods (months or years). In this case it may make sense to create one or more benchmarks represented in XCCDF and OVAL files 54, 56, and utilize these files in a number of systems without modification. This is an example of a static benchmark. In other cases, either the process 52 or another process in a particular system may be used to tailor comparison values and/or whole rules before starting a scan. For example, a default rule may require that all passwords in a system be at least 12 characters in length. A system manager may to change this comparison value to "14" or "10", for example, which may be more consistent with a particular environment or company standard. This is an example of a more customizable or dynamic benchmark.

What is claimed is:

1. A method of testing whether an integrated computing system complies with a predetermined configuration benchmark expressed as a collection of rules in a first set of markup-language statements, the integrated computing subsystem including interconnected components of different types selected from two or more of a server type, a network switch type, and a storage subsystem type, comprising:

parsing the rules in the first set of markup-language statements to obtain test definition identifiers identifying respective test definitions in a second set of markup-language statements, each test definition identifier including in at least one of the first set of markup-language statements a test value and an attribute identifier of an attribute of a component, the attribute having an actual value to be tested against the test value, the attribute identifier being an object identifier in an object model for system management information for the components, the object model expressing physical and functional relationships among the components of the integrated computing system;

invoking an interpreter for the second set of markup-language statements, the interpreter being invoked with the test definition identifier from each rule to process the corresponding test definition to (a) access the object model using the attribute identifier of the test definition to obtain the actual value for the corresponding attribute, and (b) compare the obtained actual value to the test value of the test definition to generate a comparison result value indicating whether the attribute is in compliance with the rule containing the test definition identifier; and storing the comparison result value as a compliance indicator, wherein the attribute identifier is a resource locator value defined in a representational state transfer interface for the components and their respective attributes, the resource locator value being used in a request message of the representational state transfer interface and the attribute value being returned in a corresponding response message of the representational state transfer interface.

2. The method according to claim 1, wherein the object model is an integrated object model organization of a management database storing the system management information for the components.

3. The method according to claim 2, wherein the management database provides the representational state transfer interface by which the system management information is obtained, and wherein the resource locator value is a resource locator value of a structured set of resource locator values defined in the representational state transfer interface for the components and their respective attributes.

4. The method according to claim 3, wherein the attribute value is returned as one of a plurality of tagged values in a set of markup-language statements of the response message, the set of markup-language statements including one or more statements having respective resource locator values for related components of the system.

5. The method according to claim 1, wherein parsing the rules includes invoking a first interpreter for the first set of markup-language statements to obtain the test definition identifiers.

6. The method according to claim 1, further comprising:

providing a compliance application programming interface by which the testing is initiated by an external human or machine user and the comparison result value is stored or communicated.

7. The method according to claim 1, wherein at least one of the test definitions includes multiple attribute identifiers and corresponding test values as well as criteria expressing a logical relationship expressing two or more distinct compliance conditions in which the system complies with the corresponding rule.

8. The method according to claim 7, wherein a first condition is a logical AND condition of two distinct tests on respective components and attributes, and a second condition is a third test for one of the components and attributes thereof.

9. The method according to claim 8, wherein the first condition includes a first test that a component is in scope for a compliance scan and a second test that an attribute of the component has a required value for the compliance scan, and the second condition is that the component is not in scope for the compliance scan.

10. The method according to claim 1, wherein at least one of the test definitions includes multiple attribute identifiers and corresponding test values as well as criteria expressing a logical relationship among the corresponding attributes and actual values required for the system to comply with the corresponding rule.

11. The method according to claim 10, wherein the attributes are attributes of respective components of different types, and
wherein one of the components is of a type selected from the network type and storage type, and the other component is of the server type.

12. The method according to claim 1, wherein:
the server type, network switch type, and storage subsystem type are hardware types;
the different types of the interconnected components include as software types one or both of a hypervisor type and an operating system or application type; and
the rules include a relationship rule specifying a required relationship between a hardware type component and a software type component, and the test definitions in the second set of markup-language statements include a corresponding relationship test definition expressing a test for compliance with the relationship rule.

13. The method according to claim 1, wherein:
the different types of the interconnected components include as software types both a hypervisor type and an operating system or application type; and
the rules include a relationship rule specifying a required relationship between a hypervisor type component and an operating system or application type component, and the test definitions in the second set of markup-language statements include a corresponding relationship test definition expressing a test for compliance with the relationship rule.

14. A non-transitory computer readable medium storing a set of computer instructions executable by a computerized device to cause the computerized device to perform a method of testing whether an integrated computing system complies with a predetermined configuration benchmark expressed as a collection of rules in a first set of markup-language statements, the integrated computing subsystem including interconnected components of different types selected from two or more of a server type, a network switch type, and a storage subsystem type, the method comprising:
parsing the rules in the first set of markup-language statements to obtain test definition identifiers identifying respective test definitions in a second set of markup-language statements, each test definition identifier including in at least one of the first set of markup-language statements a test value and an attribute identifier of an attribute of a component, the attribute having an actual value to be tested against the test value, the attribute identifier being an object identifier in an object model for system management information for the components, the object model expressing physical and functional relationships among the components of the integrated computing system;
invoking an interpreter for the second set of markup-language statements, the interpreter being invoked with the test definition identifier from each rule to process the corresponding test definition to (a) access the object model using the attribute identifier of the test definition to obtain the actual value for the corresponding attribute, and (b) compare the obtained actual value to the test value of the test definition to generate a comparison result value indicating whether the attribute is in compliance with the rule containing the test definition identifier; and
storing the comparison result value as a compliance indicator,
wherein the attribute identifier is a resource locator value defined in a representational state transfer interface for the components and their respective attributes, the resource locator value being used in a request message of the representational state transfer interface and the attribute value being returned in a corresponding response message of the representational state transfer interface.

15. The computer readable medium according to claim 14, wherein the object model is an integrated object model organization of a management database storing the system management information for the components.

16. The computer readable medium according to claim 15, wherein the management database provides the representational state transfer interface by which the system management information is obtained, and wherein the resource locator value is a resource locator value of a structured set of resource locator values defined in the representational state transfer interface for the components and their respective attributes.

17. The computer readable medium according to claim 16, wherein the attribute value is returned as one of a plurality of tagged values in a set of markup-language statements of the response message, the set of markup-language statements including one or more statements having respective resource locator values for related components of the system.

18. The computer readable medium according to claim 14, wherein parsing the rules includes invoking a first interpreter for the first set of markup-language statements to obtain the test definition identifiers.

19. The computer readable medium according to claim 14, wherein the method further includes: providing a compliance application programming interface by which the testing is initiated by an external human or machine user and the comparison result value is stored or communicated.

20. The computer readable medium according to claim 14, wherein at least one of the test definitions includes multiple attribute identifiers and corresponding test values as well as criteria expressing a logical relationship expressing two or more distinct compliance conditions in which the system complies with the corresponding rule.

21. The computer readable medium according to claim 20, wherein a first condition is a logical AND condition of two distinct tests on respective components and attributes, and a second condition is a third test for one of the components and attributes thereof.

22. The computer readable medium according to claim 21, wherein the first condition includes a first test that a component is in scope for a compliance scan and a second test that an attribute of the component has a required value for the compliance scan, and the second condition is that the component is not in scope for the compliance scan.

23. The computer readable medium according to claim 14, wherein at least one of the test definitions includes multiple attribute identifiers and corresponding test values as well as criteria expressing a logical relationship among the corresponding attributes and actual values required for the system to comply with the corresponding rule.

24. The computer readable medium according to claim 23, wherein the attributes are attributes of respective components of different types.

25. The computer readable medium according to claim 24, wherein one of the components is of a type selected from the network type and storage type, and the other component is of the server type.

26. The computer readable medium according to claim 14, wherein:
the server type, network switch type, and storage subsystem type are hardware types;
the different types of the interconnected components include as software types one or both of a hypervisor type and an operating system or application type; and
the rules include a relationship rule specifying a required relationship between a hardware type component and a software type component, and the test definitions in the second set of markup-language statements include a corresponding relationship test definition expressing a test for compliance with the relationship rule.

27. The computer readable medium according to claim 14, wherein:
the different types of the interconnected components include as software types both a hypervisor type and an operating system or application type; and
the rules include a relationship rule specifying a required relationship between a hypervisor type component and an operating system or application type component, and the test definitions in the second set of markup-language statements include a corresponding relationship test definition expressing a test for compliance with the relationship rule.

28. An apparatus for testing whether an integrated computing system complies with a predetermined configuration benchmark expressed as a collection of rules in a first set of markup-language statements, the integrated computing subsystem including interconnected components of different types selected from two or more of a server type, a network switch type, and a storage subsystem type, the apparatus comprising a processor and a memory storing executable instructions that in response to execution by the processor, cause the apparatus to at least:
parse the rules in the first set of markup-language statements to obtain test definition identifiers identifying respective test definitions in a second set of markup-language statements, each test definition identifier including in at least one of the first set of markup-language statements a test value and an attribute identifier of an attribute of a component, the attribute having an actual value to be tested against the test value, the attribute identifier being an object identifier in an object model for system management information for the components, the object model expressing physical and functional relationships among the components of the integrated computing system;
invoke an interpreter for the second set of markup-language statements, the interpreter being invoked with the test definition identifier from each rule to process the corresponding test definition to (a) access the object model using the attribute identifier of the test definition to obtain the actual value for the corresponding attribute, and (b) compare the obtained actual value to the test value of the test definition to generate a comparison result value indicating whether the attribute is in compliance with the rule containing the test definition identifier; and
store the comparison result value as a compliance indicator,
wherein the attribute identifier is a resource locator value defined in a representational state transfer interface for the components and their respective attributes, the resource locator value being used in a request message of the representational state transfer interface and the attribute value being returned in a corresponding response message of the representational state transfer interface.

* * * * *